(12) United States Patent
Baker

(10) Patent No.: US 9,170,969 B2
(45) Date of Patent: Oct. 27, 2015

(54) CACHED PHY REGISTER DATA ACCESS

(71) Applicant: LENOVO ENTERPRISE SOLUTIONS (SINGAPORE) PTE. LTD., New Tech Park (SG)

(72) Inventor: Anthony E. Baker, Stittsville (CA)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 13/745,828

(22) Filed: Jan. 20, 2013

(65) Prior Publication Data

US 2014/0207981 A1 Jul. 24, 2014

(51) Int. Cl.
G06F 3/00 (2006.01)
G06F 3/12 (2006.01)
G06F 13/38 (2006.01)

(52) U.S. Cl.
CPC .................. G06F 13/385 (2013.01)

(58) Field of Classification Search
CPC ......... G06F 13/00; G06F 15/16; G06F 1/206; G06F 3/064; G06F 3/127; G06F 3/165
USPC .............. 710/28, 62, 10, 11, 64, 65
See application file for complete search history.

(56) References Cited

U.S. PATENT DOCUMENTS

| 6,091,707 A * | 7/2000 | Egbert et al. | 370/229 |
|---|---|---|---|
| 6,397,315 B1 * | 5/2002 | Rahman et al. | 711/169 |
| 6,963,946 B1 * | 11/2005 | Dwork et al. | 710/310 |
| 7,194,502 B1 | 3/2007 | Gavlik et al. | |
| 7,653,783 B2 * | 1/2010 | Byrne et al. | 711/114 |
| 7,689,738 B1 * | 3/2010 | Williams et al. | 710/52 |
| 7,787,481 B1 * | 8/2010 | Liang et al. | 370/412 |
| 8,069,293 B1 * | 11/2011 | Rogan et al. | 710/301 |
| 8,504,728 B1 * | 8/2013 | Williams et al. | 709/250 |
| 8,667,194 B2 * | 3/2014 | Dybsetter et al. | 710/110 |
| 2003/0200374 A1 * | 10/2003 | Moriwaki et al. | 710/305 |

(Continued)

FOREIGN PATENT DOCUMENTS

| JP | 2003308288 A | 10/2003 |
|---|---|---|
| WO | 2011137648 A1 | 11/2011 |

OTHER PUBLICATIONS

A.C. Evans, "The New ATE: Protocol Aware", Proceedings of IEEE International Test Conference, 2007.

*Primary Examiner* — Ernest Unelus
*Assistant Examiner* — Getente A Yimer
(74) *Attorney, Agent, or Firm* — Katherine Brown

(57) ABSTRACT

Ethernet physical sublayer (PHY) devices each provide PHY register data. One or more of the Ethernet PHY devices are connected to each of one or more management data input/output (MDIO)/management data clock (MDC) interfaces to which a number of MDIO/MDC controllers are connected. Each MDIO/MDC controller polls a corresponding MDIO/MDC interface to receive the PHY register data from the one or more Ethernet PHY devices connected thereto. The MDIO/MDC controllers store portions of the PHY register data received from the Ethernet PHY devices to a memory to which an interface is connected. A processor connected to the interface accesses the portions of the PHY register data stored to the memory. The processor can retrieve the portions of the PHY register data over the interface more quickly than the MDIO/MDC controllers can retrieve the PHY register data over the MDIO/MDC interfaces.

17 Claims, 2 Drawing Sheets

(56) References Cited

U.S. PATENT DOCUMENTS

| | | | |
|---|---|---|---|
| 2004/0103198 A1* | 5/2004 | Kim et al. | 709/227 |
| 2004/0125792 A1 | 7/2004 | Bradbury et al. | |
| 2009/0031054 A1* | 1/2009 | Kato | 710/22 |
| 2011/0035580 A1* | 2/2011 | Wang et al. | 713/151 |
| 2011/0141932 A1* | 6/2011 | Iwao et al. | 370/252 |
| 2011/0142022 A1 | 6/2011 | Kubo et al. | |
| 2011/0145630 A1 | 6/2011 | Maciorowski et al. | |

* cited by examiner

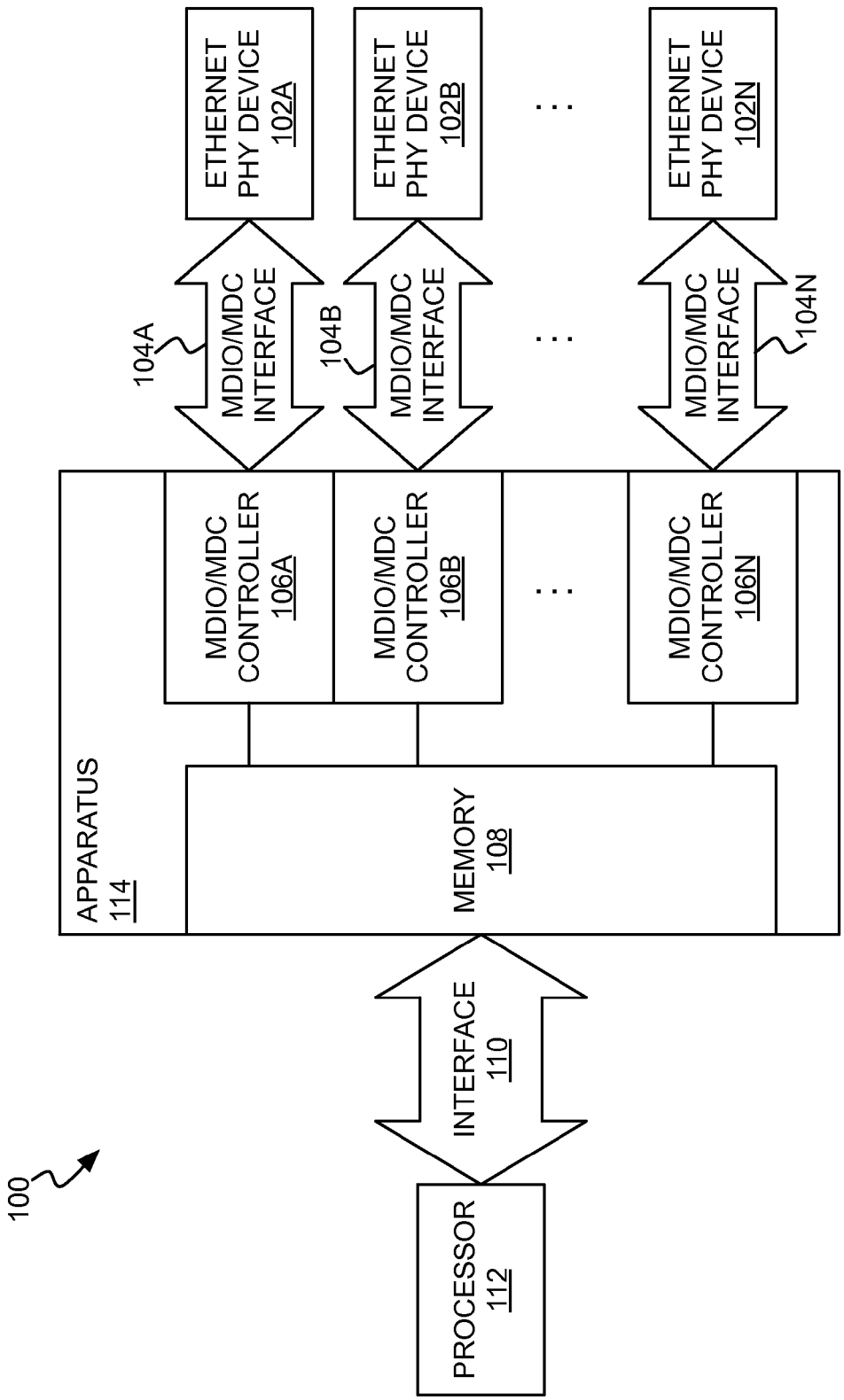

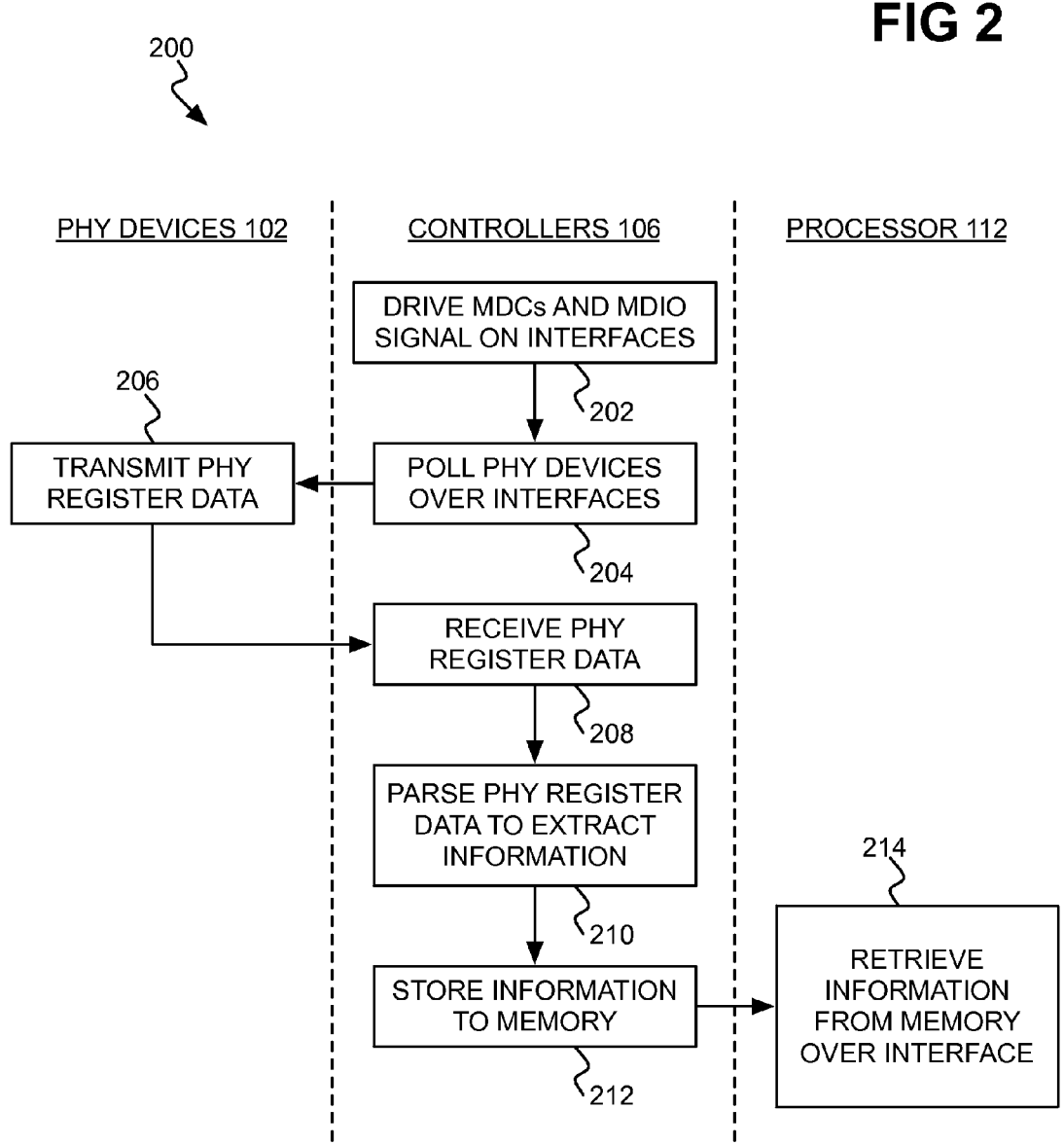

CACHED PHY REGISTER DATA ACCESS

BACKGROUND

Ethernet has evolved to meet the growing demands of packet-switched networks. It has become the unifying technology enabling communications via the Internet and other networks using the Internet Protocol (IP). Due to its proven low cost, known reliability, and simplicity, the majority of today's Internet traffic starts or ends on an Ethernet connection. This popularity has resulted in a complex ecosystem among carrier networks, enterprise networks, and consumers, creating a symbiotic relationship among its various parts.

Devices that have Ethernet capability include Ethernet physical sublayer (PHY) devices that adhere to an Ethernet standard. Ethernet PHY devices provide management information, which are referred to herein as PHY register data, indicating their status, configuration, control, and other parameters via management data input/output (MDIO)/management data clock (MDC) interfaces. MDIO is also referred to as a serial management interface (SMI), or media-independent interface management (MIIM), and is defined by the IEEE 802.3 Ethernet standard for a media independent interface (MII).

SUMMARY

An example device of the disclosure includes Ethernet physical sublayer (PHY) devices. Each Ethernet PHY device has PHY registers. The device includes one or more management data input/output (MDIO)/management data clock (MDC) interfaces. One or more Ethernet PHY devices of the Ethernet PHY devices are connected to each MDIO/MDC interface. The device includes MDIO/MDC controllers. Each MDIO/MDC controller is connected to and is to poll a corresponding MDIO/MDC interface of the MDIO/MDC interfaces to receive the PHY register data from the one or more Ethernet PHY devices connected to the corresponding MDIO/MDC interface. The device includes a memory to which the MDIO/MDC controllers are to store portions of the PHY register data received from the Ethernet PHY devices. The device includes an interface connected to the memory. The device includes an interface that connects to a processor, and through which the processor accesses the PHY register data stored to the memory.

An example apparatus of the disclosure includes MDIO/MDC controllers. Each MDIO/MDC controller is connectable to a corresponding MDIO/MDC interface of one or more MDIO/MDC interfaces to receive/set PHY register data from one or more Ethernet PHY devices connected to the corresponding MDIO/MDC interface. The example apparatus includes a memory to which the MDIO/MDC controllers are to store portions of the PHY register data received from the Ethernet PHY devices. The memory is connectable to an interface by which a processor is to access the PHY register data stored to the memory.

An example method of the disclosure includes polling, by each MDIO/MDC controller of a number of MDIO/MDC controllers, one or more Ethernet PHY devices over a corresponding MDIO/MDC interface of one or more MDIO/MDC interfaces. The method includes, after polling the one or more Ethernet PHY devices, receiving, by each MDIO/MDC controller, PHY register data from the one or more Ethernet PHY devices connected to the corresponding MDIO/MDC interface. The method includes, after receiving the PHY register data, storing, by each MDIO/MDC controller, portions of the PHY register data to a memory to which the MDIO/MDC controllers are connected and to which an interface is connected, for access by a processor connected to the interface.

BRIEF DESCRIPTION OF THE SEVERAL VIEWS OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

FIG. 1 is a diagram of an example device by which an apparatus like a field-programmable gate array (FPGA) or a complex programmable logic device (CPLD) is used to gather physical sublayer (PHY) register data from Ethernet physical sublayer (PHY) devices and to store portions of the PHY register data to a memory accessible over an interface.

FIG. 2 is flowchart of a method by which PHY register data is retrieved, stored, and accessed within the example device of FIG. 1.

DETAILED DESCRIPTION

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure.

As noted in the background section, devices that have Ethernet capability include Ethernet physical sublayer (PHY) devices that adhere to an Ethernet standard. The Ethernet PHY devices provide management information via management data input/output (MDIO)/management data clock (MDC) interfaces. In this manner, the Ethernet PHY devices can be polled to ensure, for instance, that they are operating and/or configured correctly.

The MDIO/MDC interface, however, is a processor-intensive, low-bandwidth interface. A data clock—the MDC—has to be asserted on the MDIO/MDC interface. Polling an Ethernet PHY device on the MDIO/MDC interface takes time, at least because of the low bandwidth of the interface. As such, a processor may have to apportion an undesirable amount of processing power to constantly receive management information updates from its Ethernet PHY devices.

Furthermore, a given device may have multiple Ethernet PHY devices that each have multiple MDIO/MDC interfaces. The same physical bus of the device cannot typically be used for a large number of MDIO/MDC interfaces, due to signal integrity issues. Inclusion of a multiplexer resolves this problem, but increases the length of time needed for the processor to obtain the desired management information.

An additional problem is that different MDIO/MDC interfaces can operate in accordance with different MDIO/MDC protocols that require the interfaces to operate at different voltages. Common MDIO/MDC protocols include those referred to under the nomenclature Clause 22 and Clause 45. Some Ethernet PHY devices can only support some voltages, but a given device may require that all its MDIO/MDC interfaces operate at the same voltage and not on a per-interface basis.

Disclosed herein are techniques that alleviate these shortcomings. An apparatus, such as in the form of a field-programmable gate array (FPGA) or a complex programmable logic device (CPLD), includes multiple MDIO/MDC controllers and a memory. Each MDIO/MDC controller is connected to a corresponding MDIO/MDC interface of a device, to receive/set PHY register data from one or more Ethernet PHY devices connected to this interface. The MDIO/MDC controllers store portions of the PHY register data to the memory, which is connectable to an interface by which a processor of the device accesses these PHY register data portions.

The processor therefore does not directly communicate with the Ethernet PHY devices over the MDIO/MDC interfaces to receive management information. Rather, the MDIO/MDC controllers do. As such, less processing power is used by the processor to receive this information. Furthermore, the interface can permit the processor to receive the management information from all or at least a large number of the Ethernet PHY devices within a single access. For instance, the interface may be a parallel bus, or a high-speed interface, such as a high-speed serial interface or bus like a peripheral component interconnect (PCI) serial bus or a peripheral component interconnect express (PCIe) serial bus. This increases the speed at which the management information is retrieved.

Furthermore, the PHY devices can be configured with specific register settings through commands written to the memory. The MDIO/MDC controllers interpret and act upon these commands to appropriately configure the PHY devices. The processor thus indirectly communicates with the PHY devices in this matter, through the memory and the MDIO/MDC controllers.

The different MDIO/MDC interfaces can operate at different voltages, and thus in accordance with different MDIO/MDC protocols, because the MDIO/MDC controllers are separately configurable in this respect. As such, connectivity to a greater diversity of different types of Ethernet PHY devices can be included in the same device, without concern that they may have incompatible operating voltages. A large number of Ethernet PHY devices can also be employed without the need for a multiplexer interfacing the processor thereto.

FIG. 1 shows an example device 100. The networking device 100 may be a networking device like a switching device, a routing device, a bridging device, another type of networking device, or another type of device. For example, the device 100 may be a computing device like a server computing device or a client computing device.

The device 100 includes Ethernet PHY devices 102A, 102B, . . . , 102N, which are collectively referred to as the Ethernet PHY devices 102. Each Ethernet PHY device 102 provides the device 100 with Ethernet connectivity over a separate Ethernet networking channel or lane. The device 100 includes MDIO/MDC interfaces 104A, 104B, . . . , 104N, which are collectively referred to as the MDIO/MDC interfaces 104. Each MDIO/MDC interface 104 is a serial bus that is governed by an Ethernet standard for the communication of PHY register data from and to the Ethernet PHY devices 102.

In the example of FIG. 1, each Ethernet PHY device 102 is connected to a corresponding MDIO/MDC interface 104 on a one-to-one basis. However, more generally, one or more Ethernet PHY devices 102 can be connected to each MDIO/MDC interface 104. As such, the relationship between the Ethernet PHY devices 102 and each MDIO/MDC interface 104 can be many-to-one.

The device 100 includes one or more MDIO/MDC controllers 106A, 106B, . . . , 106N, which are collectively referred to as the MDIO/MDC controllers 106. Each MDIO/MDC controller 106 is connected to a corresponding MDIO/MDC interface 104 on a one-to-one basis in the example of FIG. 1. An MDIO/MDC controller 106 polls its corresponding MDIO/MDC interface 104 to receive PHY register data from the Ethernet PHY device 102 connected to this interface 104.

The MDIO/MDC controllers 106 are separately configurable to operate in accordance with different MDIO/MDC protocols having different voltage levels at which the MDIO/MDC interfaces 104 can operate. As such, MDIO/MDC interfaces 104 at different operating voltages can be accommodated.

The device 100 includes a memory 108. The memory 108 along with the MDIO/MDC controllers 106 are implemented within an apparatus 114, such as an FPGA, a CPLD, or another type of apparatus. The MDIO/MDC controllers 106 are connected to the memory 108, and can access the memory 108 at the same time, such that the memory 108 is shared among the MDIO/MDC controllers 106. Each MDIO/MDC controller 106, upon receiving the PHY register data from the Ethernet PHY device 102 connected to the same MDIO/MDC interface 104 to which the controller 106 in question is connected, extracts management information regarding the device 102 and stores this portion of the PHY register data to the memory 108.

The device 100 includes an interface 110. The interface 110 can be a parallel bus, or a high-speed serial interface or bus like a PCI bus or a PCIe bus. A parallel bus is parallel in that multiple bits corresponding to the bit width of the bus can be retrieved in the same access (i.e., clock cycle) of the bus. The bit width of the bus may be eight bits, sixteen bits, thirty-two bits, or another number of bits. The interface 110 is connected to the memory 108. In this respective, the memory 108, in addition to being shared memory, is dual port memory, where one port of the memory 108 provides for access thereto by the MDIO/MDC controllers 106, and the other port of the memory provides for access thereto over the interface 110.

The device 100 includes a processor 112, such as a central processing unit (CPU) and/or a microprocessor. The processor 112 performs logic to control the functionality, such as configuration, routing, switching, and so on, of the device 100. To this end, the processor 112 relies upon management information, such as status and configuration parameters and/or information, which the Ethernet PHY devices 102. Therefore, the processor 112 accesses the memory 108 over the interface 110 to retrieve the management information previously stored to the memory 108 by the MDIO/MDC controllers 106.

Because the interface 110 and the memory 108 can be specified within the device 100 apart from any standard, the interface 110 may be able to operate at a higher bandwidth than the bandwidth of the MDIO/MDC interfaces 104, which are governed by an Ethernet standard. Therefore, retrieval of the management information over the interface 110 by the processor 112 can occur more quickly than retrieval of the PHY register data itself over the MDIO/MDC interfaces 104 by the MDIO/MDC controllers 106. Each MDIO/MDC controller 106 drives an MDC and MDIO signal on its corresponding MDIO/MDC interface 104 at a clock rate governed by an Ethernet standard from which it cannot deviate, and in accordance with which the Ethernet PHY device 102 connected to the interface 104 in question provides the PHY register data.

Depending on the number of the Ethernet PHY devices 102 and/or the bit width of the interface 110 where the interface 110 is a parallel bus, the processor 112 may be able to access the portions of the PHY register data stored by the MDIO/MDC controllers 106 to the memory 108 within a single access of the interface 110. For instance, if the parallel bus is thirty-two bits in width, if there are less than thirty-two Ethernet PHY devices 102, and if the management information stored to the memory 108 is just one bit in size for each PHY device 102, then in a single clock cycle the processor 112 can access the management information regarding all the devices 102. The processor 112 further can access the portions of the PHY register data stored to the memory 108 on an as-needed basis, instead of having to adhere to an Ethernet standard for the MDIO/MDC interfaces 104.

FIG. 2 shows an example method 200 as to how PHY register data is accessed within the device 100. The blocks of FIG. 2 are divided into columns corresponding to the Ethernet PHY devices 102, the MDIO/MDC controllers 106, and the processor 112. The functionality of each block is performed by the component corresponding to the column in which the block in question is located.

Each MDIO/MDC controller 106 drives an MDC and MDIO signal on its corresponding MDIO/MDC interface 104 (202). The MDC is a clock signal in accordance with which communication between the Ethernet PHY device 102 and the MDIO/MDC controller 106 occurs on the MDIO/MDC interface 104. Each MDIO/MDC controller 106 polls the Ethernet PHY device 102 connected to its MDIO/MDC interface 104 over the interface 104 (204). This polling, as well as other communication, can occur in parallel among the MDIO/MDC controllers 106 over their respective MDIO/MDC interfaces 104. That is, communication over each MDIO/MDC interface 104 is separate and independent from communication occurring over each other interface 104.

In response to being polled, each Ethernet PHY device 102 transmits its current PHY register data over the MDIO/MDC interface 104 to the MDIO/MDC controller 106 connected to the interface 104 in question (206). Each MDIO/MDC controller 106 thus receives PHY register data from the Ethernet PHY device 102 to which it is communicatively connected with over an MDIO/MDC interface 104 (208). The PHY register data is raw data, and can and typically does include information that is not needed or that is irrelevant to the type of management that is to occur of the Ethernet PHY devices 102. Therefore, each MDIO/MDC controller 106 parses its received PHY register data to extract just the relevant management information that may be desired (210), and stores the extracted management information to the memory 108 (212).

The processor 112, therefore, can independently, as desired, and/or as needed retrieve this management information from the memory 108 over the interface 110 (214). The processor 112 is thus not unencumbered by having to retrieve the (raw) PHY data from the Ethernet PHY devices 102 itself, and does not have to itself communicate over the MDIO/MDC interfaces 104. Rather, this functionality is effectively offloaded to the MDIO/MDC controllers 106. The processor instead can quickly access the management information that the MDIO/MDC controllers 106 has prepared, directly from the memory 108 over a faster interface 110.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

I claim:

1. A device comprising:
   a processor;
   a plurality of management data input/output (MDIO)/management data clock (MDC) interfaces to which the processor are not directly connected;
   a plurality of Ethernet physical sublayer (PHY) devices, one or more Ethernet PHY devices of the Ethernet PHY devices connected to each MDIO/MDC interface, each Ethernet PHY device to provide PHY register data directly onto the MDIO/MDC interface to which the Ethernet PHY device is connected;
   a plurality of MDIO/MDC controllers separate from the processor, each MDIO/MDC controller connected to and to poll a corresponding MDIO/MDC interface of the MDIO/MDC interfaces to receive the PHY register data from the one or more Ethernet PHY devices connected to the corresponding MDIO/MDC interface;
   a memory to which the MDIO/MDC controllers are to store portions of the PHY register data received from the Ethernet PHY devices; and
   an interface separate from the MDIO/MDC interfaces and connecting the memory to the processor, the processor accessing the portions of the PHY register data stored to the memory to retrieve the PHY register data without having to poll the Ethernet PHY devices itself via the MDIO/MDC interfaces,
   wherein the MDIO/MDC controllers are indirectly and not directly connected to the processor, via the MDIO/MDC controllers being directly connected to the memory, the memory being directly connected to the interface, and the interface being directly connected to the processor,
   and wherein each MDIO/MDC controller is to, responsive to receiving the PHY register data from the one or more Ethernet PHY devices connected to the corresponding MDIO/MDC interface, extract management information regarding the one or more Ethernet PHY devices from the PHY register data, and is to store the management information on the memory as the portions of the PHY register data.

2. The device of claim 1, wherein each MDIO/MDC controller is to drive an MDC and MDIO signal on the corresponding MDIO/MDC interface in accordance with which the one or more Ethernet PHY devices connected thereto provide the PHY register data.

3. The device of claim 1, wherein each MDIO/MDC interface is a single-bit, serial bus,
   and wherein the interface is one of: a multiple-bit, parallel bus; a peripheral component interconnect (PCI) serial bus; a peripheral component interconnect express (PCIe) bus.

4. The device of claim 1, wherein retrieval of the PHY register data by the MDIO/MDC controllers over the MDIO/MDC interfaces occurs more slowly than retrieval of the portions of the PHY register data by the processor over the interface.

5. The device of claim 1, wherein each MDIO/MDC controller is separately configurable to operate according to one of a plurality of different MDIO/MDC protocols, each MDIO/MDC protocol having a different voltage level at which the MDIO/MDC interface is to operate.

6. The device of claim 5, wherein at a given time, different of the MDIO/MDC controllers are operating according to different of the MDIO/MDC protocols.

7. The device of claim 1, further comprising one of a field-programmable gate array (FPGA) and a complex programmable logic device (CPLD), within which the MDIO/MDC controllers and the memory are implemented.

8. The device of claim 1, wherein the processor is to access the portions of the PHY register data stored to the memory for all the Ethernet PHY devices within a single access of the interface.

9. The device of claim 1, wherein the processor is to access the portions of the PHY register data stored to the memory on an as-needed basis.

10. An apparatus for a device including a processor, comprising:
- a plurality of management data input/output (MDIO)/management data clock (MDC) controllers separate from the processor of the device, each MDIO/MDC controller connectable to a corresponding MDIO/MDC interface of one or more MDIO/MDC interfaces to which the processor are not directly connected to receive PHY register data from one or more Ethernet physical sublayer (PHY) devices connected to the corresponding MDIO/MDC interface by polling the corresponding MDIO/MDC interface so that the processor avoids having to poll the corresponding MDIO/MDC interface itself; and
- a memory to which the MDIO/MDC controllers are to store portions of the PHY register data received from the Ethernet PHY devices, the memory connectable to an interface other than the MDIO/MDC interfaces and by which the processor is to access the portions of the PHY register data stored to the memory to retrieve the PHY register data without having to poll the Ethernet devices itself via the MDIO/MDC interfaces,
- wherein the MDIO/MDC controllers are indirectly and not directly connected to the processor, via the MDIO/MDC controllers being directly connected to the memory, the memory being directly connected to the interface, and the interface being directly connected to the processor,
- and wherein each MDIO/MDC controller is to, responsive to receiving the PHY register data from the one or more Ethernet PHY devices connected to the corresponding MDIO/MDC interface, extract management information regarding the one or more Ethernet PHY devices from the PHY register data, and is to store the management information on the memory as the portions of the PHY register data.

11. The apparatus of claim 10, wherein retrieval of the PHY register data by the MDIO/MDC controllers over the MDIO/MDC interfaces occurs more slowly than retrieval of the portions of the PHY register data by the processor from the memory.

12. The apparatus of claim 10, wherein each MDIO/MDC controller is configurable to operate according to one of a plurality of different MDIO/MDC protocols, each MDIO/MDC protocol having a different voltage level at which the MDIO/MDC interface is to operate.

13. The apparatus of claim 10, wherein the apparatus is implemented as one of a field-programmable gate array (FPGA) and a complex programmable logic device (CPLD).

14. A method comprising:
- polling, by each management data input/output (MDIO)/management data controller (MDC) controller of a plurality of MDIO/MDC controllers of an apparatus of a device also including a processor separate from the MDIO/MDC controllers, one or more Ethernet physical sublayer (PHY) devices over a corresponding MDIO/MDC interface of one or more MDIO/MDC interfaces to which the processor are not directly connected;
- after polling the one or more Ethernet PHY devices, receiving, by each MDIO/MDC controller, PHY register data from the one or more Ethernet PHY devices connected to the corresponding MDIO/MDC interface;
- after receiving the PHY register data, extracting, by each MDIO/MDC controller, management information regarding the one or more Ethernet PHY devices from the PHY register data, as portions of the PHY register data; and
- after extracting the management information, storing, by each MDIO/MDC controller, the portions of the PHY register data to a memory to which the MDIO/MDC controllers are connected and to which an interface is connected, for access by the processor connected to the interface to retrieve the PHY register data without having to poll the Ethernet PHY devices itself via the MDIO/MDC interfaces,
- wherein the MDIO/MDC controllers are indirectly and not directly connected to the processor, via the MDIO/MDC controllers being directly connected to the memory, the memory being directly connected to the interface, and the interface being directly connected to the processor.

15. The method of claim 14, further comprising:
- driving, by each MDIO/MDC controller, an MDC and MDIO signal on the corresponding MDIO/MDC interface in accordance with which the one or more Ethernet PHY devices connected thereto provide the PHY register data.

16. The method of claim 14, further comprising, in response to being polled:
- providing, by each Ethernet PHY device of the one or more Ethernet PHY devices, the PHY register data over the corresponding MDIO/MDC interface.

17. The method of claim 14, further comprising:
- accessing, by the processor, the portions of the PHY register data from the memory over the interface within a single access of the interface.

* * * * *